(12) United States Patent
Bozzolo et al.

(10) Patent No.: US 9,972,855 B2
(45) Date of Patent: May 15, 2018

(54) SOLID OXIDE FUEL CELL SYSTEM AND A METHOD OF OPERATING A SOLID OXIDE FUEL CELL SYSTEM

(75) Inventors: Michele Bozzolo, Derby (GB); Gerald Daniel Agnew, Derby (GB)

(73) Assignee: LG FUEL CELL SYSTEMS INC., North Canton, DE (US)

(*) Notice: Subject to any disclaimer, the term of this patent is extended or adjusted under 35 U.S.C. 154(b) by 1321 days.

(21) Appl. No.: 13/991,085

(22) PCT Filed: Nov. 10, 2011

(86) PCT No.: PCT/EP2011/069844
§ 371 (c)(1),
(2), (4) Date: Aug. 12, 2013

(87) PCT Pub. No.: WO2012/072400
PCT Pub. Date: Jun. 7, 2012

(65) Prior Publication Data
US 2013/0316255 A1    Nov. 28, 2013

(30) Foreign Application Priority Data

Dec. 1, 2010   (GB) .................................. 1020289.3

(51) Int. Cl.
*H01M 8/04* (2016.01)
*H01M 8/04082* (2016.01)
(Continued)

(52) U.S. Cl.
CPC ... *H01M 8/04201* (2013.01); *H01M 8/04022* (2013.01); *H01M 8/04097* (2013.01);
(Continued)

(58) Field of Classification Search
CPC ......... H01M 8/04022; H01M 8/04097; H01M 8/04111; H01M 8/04201; H01M 8/0681;
(Continued)

(56) References Cited

U.S. PATENT DOCUMENTS

| 7,118,818 B2 | 10/2006 | Agnew et al. |
| 2004/0062973 A1* | 4/2004 | Agnew ............ H01M 8/04022 |
| | | 429/423 |

FOREIGN PATENT DOCUMENTS

| DE | 102008018941 A1 | 10/2009 |
| EP | 1511110 A2 | 3/2005 |

(Continued)

OTHER PUBLICATIONS

Machine translation of JP2006-019123, Uehara et al., Jan. 2006.*
(Continued)

*Primary Examiner* — Lisa S Park
(74) *Attorney, Agent, or Firm* — Dentons US LLP

(57) ABSTRACT

A solid oxide fuel cell system (10) comprises a solid oxide fuel cell stack (12) and an electrochemical device (14). The solid oxide fuel cell stack (12) comprises at least one solid oxide fuel cell (16) and each solid oxide fuel cell (16) comprises an electrolyte (18), an anode (20) and a cathode (22). An oxidant supply (24) is arranged to supply oxidant to the cathode (22) of the at least one solid oxide fuel cell (16) and a fuel supply (26) is arranged to supply fuel to the anode (20) of the at least one solid oxide fuel cell (16). The electrochemical device (14) comprises an electrolyte (34), an anode (36) and a cathode (38). Means (28, 50, 52) to supply a portion of the unused fuel from the anode (20) of the at least one solid oxide fuel cell (16) to the anode (36) of the electrochemical device (14), means (32, 50, 58) to supply a portion of the unused fuel from the anode (20) of the at least one solid oxide fuel cell (16) to the cathode (38) of the electrochemical device (14). In use the electrochemical device (14) is arranged to remove oxygen from the unused fuel at the cathode (38) of the electrochemical device (14) and the electrochemical device (14) is arranged to transfer oxygen through the electrolyte (34) from the unused fuel at the cathode (38) of the electrochemical device (14) to
(Continued)

the unused fuel at the anode (36) of the electrochemical device (14). The electrochemical device (14) is arranged to oxidise the unused fuel at the anode (34) of the electrochemical device (14) and means (32, 60, 62, 68) to supply the portion of oxygen depleted unused fuel from the cathode (38) of the electrochemical device (14) to the anode (20) of the at least one solid oxide fuel cell (16).

12 Claims, 4 Drawing Sheets

(51) Int. Cl.
*H01M 8/04014* (2016.01)
*H01M 8/04089* (2016.01)
*H01M 8/04111* (2016.01)
*H01M 8/0662* (2016.01)
*H01M 8/124* (2016.01)

(52) U.S. Cl.
CPC ...... *H01M 8/04111* (2013.01); *H01M 8/0681* (2013.01); *H01M 2008/1293* (2013.01)

(58) Field of Classification Search
CPC ............ H01M 2008/1293; Y02E 60/50; Y02E 60/525
See application file for complete search history.

(56) References Cited

FOREIGN PATENT DOCUMENTS

| | | |
|---|---|---|
| JP | H11297336 A | 10/1999 |
| JP | 2006019123 A | 1/2006 |
| JP | 2006501616 A | 1/2006 |
| WO | 2004032273 A2 | 4/2004 |
| WO | 2007014128 A2 | 2/2007 |
| WO | 2009127188 A2 | 10/2009 |
| WO | WO2011137916 * | 11/2011 |

OTHER PUBLICATIONS

Machine translation of DE102008018941, Kaeding et al., Oct. 2009.*

Translation of counterpart Japanese Office Action dated Aug. 4, 2015 for Japanese Application No. 2013-541276, 5 pp.

International Search Report for corresponding PCT Application No. PCT/EP2011/069844, dated Jan. 30, 2012 (4 pages).

Written Opinion for corresponding PCT Application No. PCT/EP2011/069844, dated Jan. 30, 2012 (5 pages).

* cited by examiner

SOLID OXIDE FUEL CELL SYSTEM AND A METHOD OF OPERATING A SOLID OXIDE FUEL CELL SYSTEM

The present invention relates to a high temperature fuel cell system, in particular to a solid oxide fuel cell system.

In a known solid oxide fuel cell system a first portion of the exhaust gases leaving the anodes of the solid oxide fuel cells are recycled back to the anodes of the solid oxide fuel cells with fresh fuel supplied to the anodes of the solid oxide fuel cells so as to provide steam for processing of the fresh fuel. In addition a second portion of the exhaust gases leaving the anodes of the solid oxide fuel cells are supplied to a combustor and are burnt in the combustor. The burnt exhaust gases are used to heat the reactant and solid oxide fuel cells to a suitable temperature for the electrochemical reactions to occur in the solid oxide fuel cells. However, the amount of fuel burnt in the combustor in excess of what is required to heat the reactants and solid oxide fuel cells to the suitable temperature for the electrochemical reactions to occur decreases the global conversion efficiency. The complete electrochemical conversion of the fuel in the solid oxide fuel cells would be carried out at low efficiency. The creation of an oxidising atmosphere at the exhaust of the solid oxide fuel cells would create problems for the design of the solid oxide fuel cell system and create problems in the choice of materials, e.g. require materials which are oxidation resistant, for the solid oxide fuel cell system.

Accordingly the present invention seeks to provide a novel solid oxide fuel cell system which reduces, preferably, overcomes the above mentioned problem.

Accordingly the present invention provides a solid oxide fuel cell system comprising a solid oxide fuel cell stack and an electrochemical device, the solid oxide fuel cell stack comprising at least one solid oxide fuel cell, each solid oxide fuel cell comprising an electrolyte, an anode and a cathode, an oxidant supply being arranged to supply oxidant to the cathode of the at least one solid oxide fuel cell, a fuel supply being arranged to supply fuel to the anode of the at least one solid oxide fuel cell, the electrochemical device comprising an electrolyte, an anode and a cathode, means to supply a portion of the unused fuel from the anode of the at least one solid oxide fuel cell to the cathode of the electrochemical device, means to supply a portion of the unused fuel from the anode of the at least one solid oxide fuel cell to the anode of the electrochemical device, whereby the electrochemical device is arranged to remove oxygen from the unused fuel at the cathode of the electrochemical device, the electrochemical device is arranged to transfer oxygen through the electrolyte from the unused fuel at the cathode of the electrochemical device to the unused fuel at the anode of the electrochemical device, and means to supply the portion of oxygen depleted unused fuel from the cathode of the electrochemical device to the anode of the at least one solid oxide fuel cell.

There may be means to supply the portion of the unused fuel and oxygen at the anode of the electrochemical device to a combustor.

There may be means to supply a portion of the unused fuel from the anode of the at least one solid oxide fuel cell to a combustor, the electrochemical device is arranged to transfer oxygen through the electrolyte from the unused fuel at the cathode of the electrochemical device to the anode of the electrochemical device and means to supply the portion of the unused fuel and oxygen at the anode of the electrochemical device to the combustor.

The solid oxide fuel cell system may comprise a gas turbine engine, the gas turbine engine comprising a compressor and a turbine arranged to drive the compressor, the compressor being arranged to supply at least a portion of the oxidant to the cathode of the at least one solid oxide fuel cell.

The means to supply the portion of oxygen depleted unused fuel from the cathode of the electrochemical device to the anode of the at least one solid oxide fuel cell may comprise means to mix the portion of the oxygen depleted unused fuel from the cathode of the electrochemical device with fuel supplied by the fuel supply.

The means to mix the portion of the oxygen depleted unused fuel from the cathode of the electrochemical device with fuel supplied by the fuel supply may comprise a fuel ejector.

The solid oxide fuel cell system may comprise means to supply a portion of the unused oxidant from the cathode of the at least one solid oxide fuel cell back to the cathode of the at least one solid oxide fuel cell.

The means to supply a portion of the unused oxidant from the cathode of the at least one solid oxide fuel cell back to the cathode of the at least one solid oxide fuel cell may comprise means to mix the portion of the unused oxidant from the cathode of the at least one solid oxide fuel cell with oxidant supplied by the oxidant supply.

The means to mix the portion of the unused oxidant from the cathode of the at least one solid oxide fuel cell with oxidant supplied by the oxidant supply may comprise an oxidant ejector.

The solid oxide fuel cell system may comprise means to supply a portion of the unused oxidant from the cathode of the at least one solid oxide fuel cell to the combustor.

The solid oxide fuel cell system may comprise means to supply exhaust gases from the combustor to the turbine of the gas turbine engine.

The means to supply the exhaust gases from the combustor to the turbine of the gas turbine engine may comprise a heat exchanger.

The means to supply a portion of the unused oxidant from the cathode of the at least one solid oxide fuel cell back to the cathode of the at least one solid oxide fuel cell may comprise a heat exchanger.

The solid oxide fuel cell stack may be arranged to supply electricity to the electrochemical device.

The turbine of the gas turbine engine may be arranged to drive an electrical generator.

The electrical generator may be arranged to supply electricity to the electrochemical device.

The present invention also provides a solid oxide fuel cell system comprising a solid oxide fuel cell stack and an electrochemical device, the solid oxide fuel cell stack comprising at least one solid oxide fuel cell, each solid oxide fuel cell comprising an electrolyte, an anode and a cathode, an oxidant supply being arranged to supply oxidant to the cathode of the at least one solid oxide fuel cell, a fuel supply being arranged to supply fuel to the anode of the at least one solid oxide fuel cell, means to supply a portion of the unused fuel from the anode of the at least one solid oxide fuel cell to a combustor, means to supply a portion of the unused fuel from the anode of the at least one solid oxide fuel cell back to the anode of the at least one solid oxide fuel cell, the electrochemical device comprises an electrolyte, an anode and a cathode, wherein the means to supply a portion of the unused fuel to the combustor being arranged to supply the unused fuel to the anode of the electrochemical device and the means to supply a portion of the unused fuel back to the anode of the at least one solid oxide fuel cell being arranged to supply unused fuel to the cathode of the electrochemical device whereby the electrochemical device is arranged to remove oxygen from the unused fuel at the cathode of the electrochemical device, the electrochemical device is arranged to transfer oxygen through the electrolyte from the unused fuel at the cathode of the electrochemical device to the unused fuel at the anode of the electrochemical device and the electrochemical device is arranged to oxidise the unused fuel at the anode of the electrochemical device.

The present invention also provides a method of operating a solid oxide fuel cell system, the solid oxide fuel cell system comprising a solid oxide fuel cell stack and an electrochemical device, the solid oxide fuel cell stack comprising at least one solid oxide fuel cell, each solid oxide fuel cell comprising an electrolyte, an anode and a cathode, the electrochemical device comprising an electrolyte, an anode and a cathode, the method comprising supplying oxidant to the cathode of the at least one solid oxide fuel cell, supplying fuel to the anode of the at least one solid oxide fuel cell, supplying a portion of the unused fuel from the anode of the at least one solid oxide fuel cell to the cathode of the electrochemical device, supplying a portion of the unused fuel from the anode of the at least one solid oxide fuel cell to the anode of the electrochemical device, removing oxygen from the unused fuel at the cathode of the electrochemical device, transferring oxygen through the electrolyte from the unused fuel at the cathode of the electrochemical device to the unused fuel at the anode of the electrochemical device and supplying oxygen depleted unused fuel from the cathode of the electrochemical device to the anode of the at least one solid oxide fuel cell.

The method may comprise supplying the portion of the unused fuel and oxygen at the anode of the electrochemical device to a combustor.

The method may comprising supplying a portion of the unused fuel from the anode of the at least one solid oxide fuel cell to a combustor, transferring oxygen through the electrolyte from the unused fuel at the cathode of the electrochemical device to the anode of the electrochemical device and supplying the portion of the unused fuel and oxygen at the anode of the electrochemical device to the combustor.

The solid oxide fuel cell system may comprise a gas turbine engine, the gas turbine engine comprising a compressor and a turbine arranged to drive the compressor, the method comprising supplying at least a portion of the oxidant to the cathode of the at least one solid oxide fuel cell via the compressor.

The method may comprise mixing the portion of the oxygen depleted unused fuel from the cathode of the electrochemical device with fuel supplied by a fuel supply.

The method may comprise mixing the portion of the oxygen depleted unused fuel from the cathode of the electrochemical device with fuel supplied by the fuel supply using a fuel ejector.

The method may comprise supplying a portion of the unused oxidant from the cathode of the at least one solid oxide fuel cell back to the cathode of the at least one solid oxide fuel cell.

The method may comprise mixing the portion of the unused oxidant from the cathode of the at least one solid oxide fuel cell with oxidant supplied by an oxidant supply.

The method may comprise mixing the portion of the unused oxidant from the cathode of the at least one solid oxide fuel cell with oxidant supplied by the oxidant supply using an oxidant ejector.

The method may comprise supplying the portion of the unused fuel from the anode of the electrochemical device to a combustor.

The method may comprise supplying a portion of the unused oxidant from the cathode of the at least one solid oxide fuel cell to the combustor.

The method may comprise supplying exhaust gases from the combustor to the turbine of the gas turbine engine.

The method may comprise supplying electricity to the electrochemical device.

The method may comprise driving an electrical generator using the turbine of the gas turbine engine.

The method may comprise supplying electricity from the electrical generator to the electrochemical device.

The present invention also provides a method of operating a solid oxide fuel cell system, the solid oxide fuel cell system comprising a solid oxide fuel cell stack and an electrochemical device, the solid oxide fuel cell stack comprising at least one solid oxide fuel cell, each solid oxide fuel cell comprising an electrolyte, an anode and a cathode, the electrochemical device comprises an electrolyte, an anode and a cathode, the method comprising supplying oxidant to the cathode of the at least one solid oxide fuel cell, supplying fuel to the anode of the at least one solid oxide fuel cell, supplying a portion of the unused fuel from the anode of the at least one solid oxide fuel cell to a combustor, supplying a portion of the unused fuel from the anode of the at least one solid oxide fuel cell back to the anode of the at least one solid oxide fuel cell, supplying the portion of the unused fuel to the combustor via the anode of the electrochemical device, supplying the portion of the unused fuel back to the anode of the at least one solid oxide fuel cell via the cathode of the electrochemical device, removing oxygen from the unused fuel at the cathode of the electrochemical device, transferring oxygen through the electrolyte from the unused fuel at the cathode of the electrochemical device to the unused fuel at the anode of the electrochemical device and oxidising the unused fuel at the anode of the electrochemical device.

The present invention will be more fully described by way of example with reference to the accompanying drawings, in which:—

Figure 1:
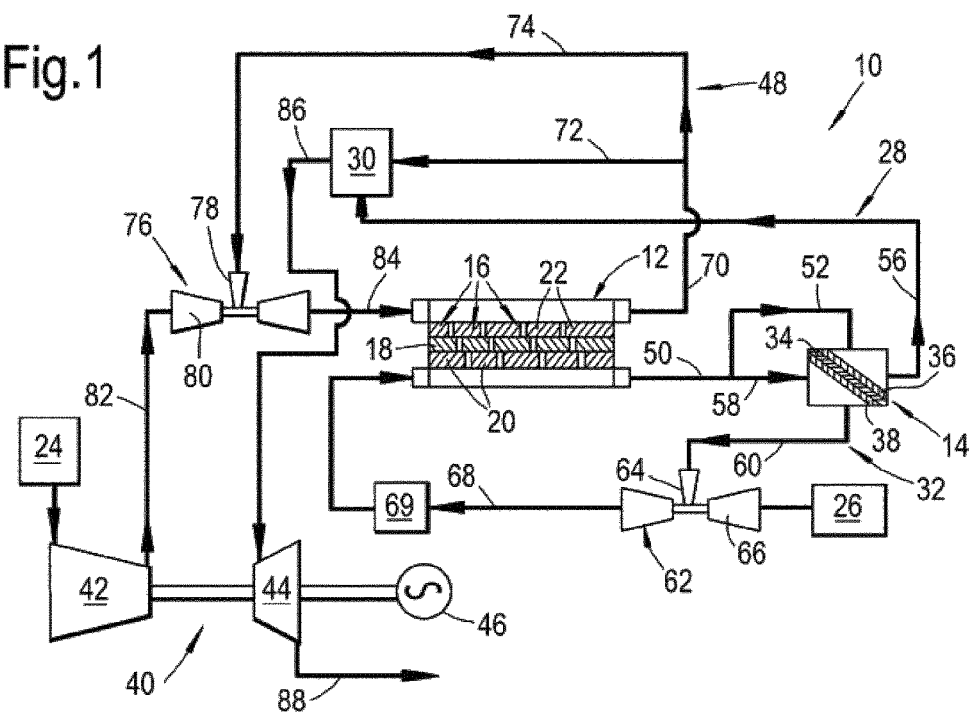
FIG. 1 is a schematic view of a first solid oxide fuel cell system according to the present invention.

A solid oxide fuel cell system 10, as shown in FIG. 1, comprises a solid oxide fuel cell stack 12 and an electrochemical device 14. The solid oxide fuel cell stack 10 comprises at least one solid oxide fuel cell 16, preferably a plurality of solid oxide fuel cells 16, and each solid oxide fuel cell 16 comprises an electrolyte 18, an anode 20 and a cathode 22. An oxidant supply 24 is arranged to supply oxidant to the cathode 22 of each solid oxide fuel cell 16 and a fuel supply 26 is arranged to supply fuel to the anode 20 of each solid oxide fuel cell 16. There are means 28 to supply a portion of the unused fuel from the anode 20 of each solid oxide fuel cell 16 to a combustor 30 and there are means 32 to supply a portion of the unused fuel from the anode 20 of each solid oxide fuel cell 16 back to the anode 20 of each solid oxide fuel cell 16. The electrochemical device 14 comprises an electrolyte 34, an anode 36 and a cathode 38. The means 28 to supply a portion of the unused fuel from the anodes 20 of the solid oxide fuel cells 16 to the combustor 30 is arranged to supply the unused fuel to the anode 36 of the electrochemical device 14 and the means 32 to supply a portion of the unused fuel from the anodes 20 of the solid oxide fuel cells 16 back to the anodes 16 of the solid oxide fuel cells 16 is arranged to supply a portion of the unused fuel to the cathode 38 of the electrochemical device 14. The electrochemical device 14 is arranged to remove oxygen from the unused fuel at the cathode 38 of the electrochemical device 14. The electrochemical device 14 is arranged to transfer oxygen through the electrolyte 34 from the unused fuel at the cathode 38 of the electrochemical device 14 to the unused fuel at the anode 36 of the electrochemical device 14 and the electrochemical device 14 is arranged to use the oxygen transferred through the electrolyte 34 to oxidise the unused fuel at the anode 36 of the electrochemical device 14. The electrochemical device 14 is supplied with electricity in order to remove oxygen from the unused fuel at the cathode 38 of the electrochemical device 14.

The means 28 to supply a portion of the unused fuel from the anodes 20 of the solid oxide fuel cells 16 to the combustor 30 is arranged to supply the unused fuel from the anodes 20 via a duct 50 and a duct 52 to the anode 36 of the electrochemical device 14. A duct 56 carries the unused fuel from the anodes 20 of the solid oxide fuel cells 16, and additional oxygen transferred from the unused fuel from the anodes 20 of the solid oxide fuel cells 16 in the cathode 38 of the electrochemical device 14, from the anode 36 of the electrochemical device 14 to the combustor 30. The means 32 to supply a portion of the unused fuel from the anodes 20 of the solid oxide fuel cells 16 back to the anodes 20 of the solid oxide fuel cells 16 is arranged to supply the unused fuel from the anodes 20 via the duct 50 and a duct 58 to the cathode 38 of the electrochemical device 14. A duct 60 carries the unused fuel from the anodes of the solid oxide fuel cells 16, which has had oxygen removed by the electrochemical device 14, from the cathode 38 of the electrochemical device 14 to a secondary inlet 64 of a fuel ejector 62. Fuel is supplied to a primary inlet 66 of the fuel ejector 62 from the fuel supply 26. The outlet of the fuel ejector 62 is arranged to supply fresh fuel and a portion of the unused fuel from the anodes 20 of the solid oxide fuel cells 16 to the anodes 20 of the solid oxide fuel cells 16 via a duct 68 and a reformer 69. The reformer 69 is arranged to reform fuel.

The solid oxide fuel cell system 10 comprises a gas turbine engine 40, the gas turbine engine 40 comprises a compressor 42 and a turbine 44 arranged to drive the compressor 42. The compressor 42 is arranged to supply at least a portion of the oxidant to the cathodes 22 of the solid oxide fuel cells 16. The oxidant supply 24 is arranged to supply oxidant via the compressor 42 to the cathodes 22 of the solid oxide fuel cells 16. The turbine 44 may be arranged to drive an electrical generator 46.

The solid oxide fuel cell system 10 also comprises means 48 to supply a portion of the unused oxidant from the cathodes 22 of the solid oxide fuel cells 16 back to the cathodes 22 of the solid oxide fuel cells 16. The means 48 to supply a portion of the unused oxidant from the cathodes 22 of the solid oxide fuel cells 16 back to the cathodes of the solid oxide fuel cells 16 is arranged to supply the unused oxidant from the cathodes 22 via a duct 70 and a duct 74 to a secondary inlet 78 of an oxidant ejector 76. Oxidant is supplied to a primary inlet 80 of the oxidant ejector 76 from the oxidant supply 24 via the compressor 42 of the gas turbine engine 40 and a duct 82. The outlet of the oxidant ejector 76 is arranged to supply fresh oxidant and a portion of the unused oxidant from the cathodes 22 of the solid oxide fuel cells 16 to the cathodes 22 of the solid oxide fuel cells 16 via a duct 84. The reformer 69 is arranged in heat exchange relationship with unused oxidant from the cathodes 22 in the duct 70 such that the unused oxidant provides heat for the reforming reaction in the reformer 69.

A portion of the unused oxidant from the cathodes 22 of the solid oxide fuel cells 16 is supplied from the cathodes 22 of the solid oxide fuel cells 16 via the duct 70 and a duct 72 to the combustor 30. The portion of the unused fuel supplied from the anodes 22 of the solid oxide fuel cells 16 to the combustor 30 is burnt in the portion of unused oxidant supplied from the cathodes 22 of the solid oxide fuel cells 16 to produce hot gases and these hot gases are supplied via a duct 86 to the turbine 44 of the gas turbine engine 40 to drive the compressor 42 and the electrical generator 46. The hot gases then leave the turbine 44 via an exhaust duct 88 to atmosphere.

The electrochemical device 14 may be supplied with electricity by the solid oxide fuel cell stack 12, the electrical generator 46 or by another suitable electrical supply, e.g. a battery or an electrical network.

The present invention removes oxygen, oxidant, from the unused fuel recycled from the anodes 20 of the solid oxide fuel cells 16 back to the anodes 20 of the solid oxide fuel cells 16 and increases the amount, or proportion, of fuel recycled back to the anodes 20 of the solid oxide fuel cells 16 and hence allows a decrease in the amount, or proportion, of fuel supplied by the fuel supply 26 to the anodes 20 of the solid oxide fuel cells 16. This provides high utilisation of the fuel supplied by the fuel supply 26 and maintains a substantial partial pressure of flammable fuel at the outlet of the solid oxide fuel cell stack 12 and as a result the overall efficiency of the solid oxide fuel cell system 10 is increased.

The fuel supply 26 may be a supply of hydrogen and in such circumstances there is no need for a reformer 69 in the duct 68 between the fuel ejector 62 and the anodes 20 of the solid oxide fuel cells 16. If the solid oxide fuel cells 16 reform fuel on the anodes 20 of the solid oxide fuel cells 16 there may be no need for a reformer 69 in the duct 68 between the fuel ejector 62 and the anodes 20 of the solid oxide fuel cells 16. The fuel supply 26 may be a supply of syngas, or similar mixture of gases, produced by reforming hydrocarbon. The syngas is a mixture of hydrogen and carbon monoxide and may contain methane.

Figure 2:
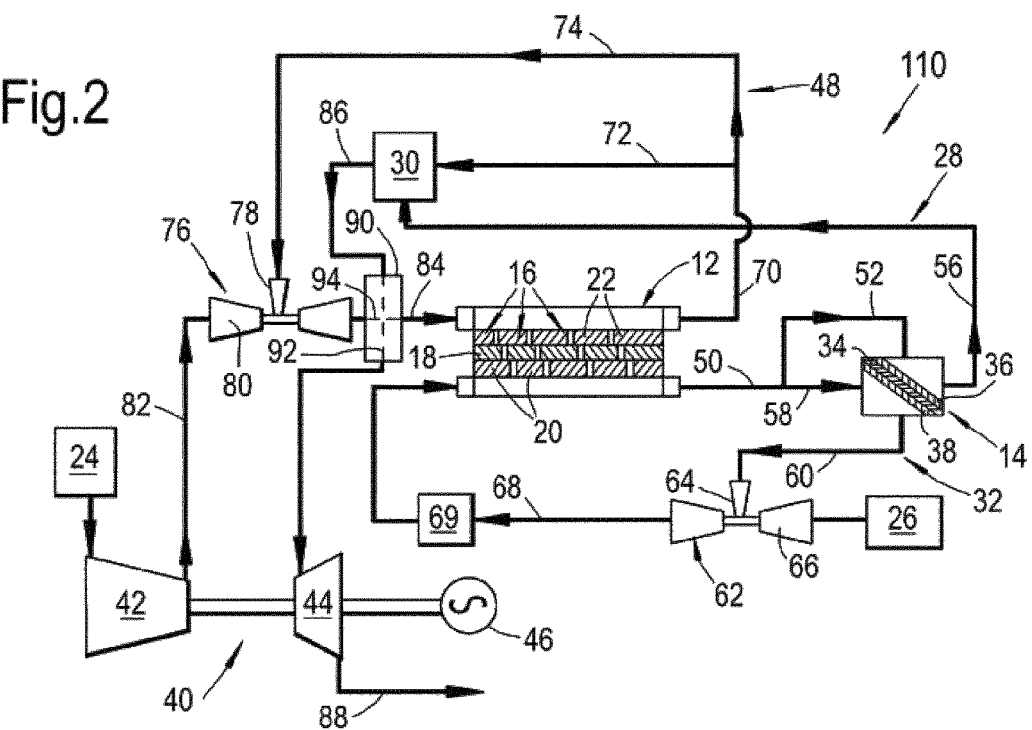
FIG. 2 is a schematic view of a second solid oxide fuel cell system according to the present invention.

A solid oxide fuel cell system 110, as shown in FIG. 2, comprises a solid oxide fuel cell stack 12 and an electrochemical device 14. The solid oxide fuel cell system 110 shown in FIG. 2 is substantially the same as that shown in FIG. 1 and like parts are denoted by like numerals. FIG. 2 differs in that a heat exchanger 90 is provided. The duct 86 between the combustor 30 and the turbine 44 of the gas turbine engine 40 extends through a first passage, or first passages, 92 in the heat exchanger 90 and the duct 84 between the oxidant ejector 76 and the cathodes 22 of the solid oxide fuel cells 16 extends through a second passage, or second passages, 94 in the heat exchanger 90. The first and second passages 92 and 94 of the heat exchanger 90 are arranged to transfer heat from the hot gases in the first passage(s) 92 to the oxidant in the second passage(s) 94 to preheat the oxidant supplied to the cathodes 22 of the solid oxide fuel cells 16.

Figure 3:
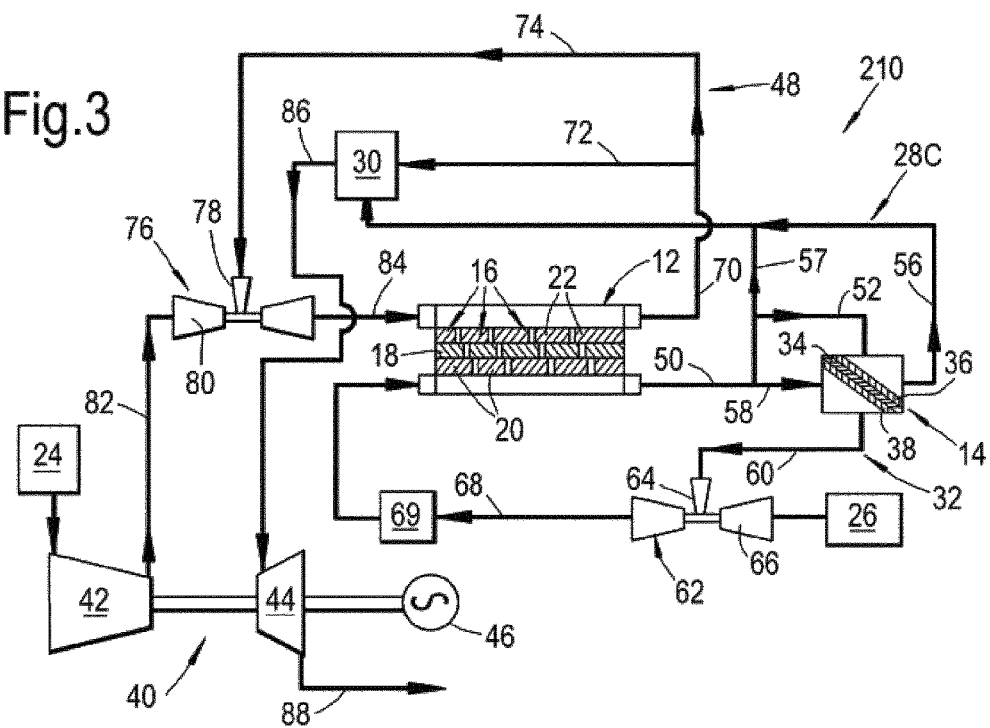
FIG. 3 is a schematic view of third solid oxide fuel cell system according to the present invention.

A solid oxide fuel cell system 210, as shown in FIG. 3, comprises a solid oxide fuel cell stack 12 and an electrochemical device 14. The solid oxide fuel cell system 210 shown in FIG. 3 is substantially the same as that shown in FIG. 1 and like parts are denoted by like numerals. FIG. 3 also comprises means 28C to supply a portion of the unused fuel from the anodes 20 of the solid oxide fuel cells 16 to the combustor 30 is arranged to supply the unused fuel from the anodes 20 via a duct 50 and a duct 52 to the anode 36 of the electrochemical device 14. A duct 56 carries the unused fuel from the anodes 20 of the solid oxide fuel cells 16, and additional oxygen transferred from the unused fuel from the anodes 20 of the solid oxide fuel cells 16 in the cathode 38 of the electrochemical device 14, from the anode 36 of the electrochemical device 14 to the combustor 30. The means 32 to supply a portion of the unused fuel from the anodes 20 of the solid oxide fuel cells 16 back to the anodes 16 of the solid oxide fuel cells 16 is arranged to supply the unused fuel from the anodes 20 via the duct 50 and a duct 58 to the cathode 38 of the electrochemical device 14. FIG. 3 differs in that a duct 57 is provided to interconnect ducts 52 and 56 in order to supply a portion of the unused fuel from the anodes 20 of the solid oxide fuel cells 16 in the duct 52 directly to the combustor 30 via the duct 56.

Figure 4:
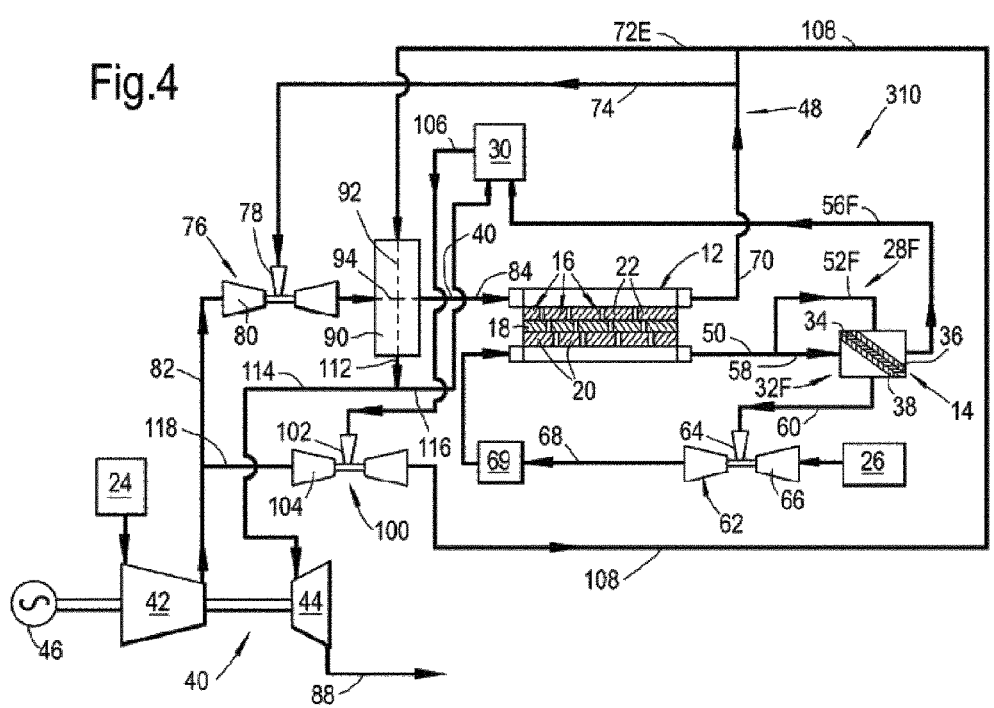
FIG. 4 is a schematic view of a fourth solid oxide fuel cell system according to the present invention.

A solid oxide fuel cell system 310, as shown in FIG. 4, comprises a solid oxide fuel cell stack 12 and an electrochemical device 14. The solid oxide fuel cell system 310 shown in FIG. 4 is substantially the same as that shown in FIG. 2 and like parts are denoted by like numerals. FIG. 4 comprise means 28F to supply a portion of the unused fuel from the anodes 20 of the solid oxide fuel cells 16 to the combustor 30 which is arranged to supply the unused fuel to the anode 36 of the electrochemical device 14 and the means 32F to supply a portion of the unused fuel from the anodes 20 of the solid oxide fuel cells 16 back to the anodes 20 of the solid oxide fuel cells 16 is arranged to supply a portion of the unused fuel to the cathode 38 of the electrochemical device 14. A duct 56F carries the unused fuel from the anodes 20 of the solid oxide fuel cells 16, and additional oxygen transferred from the unused fuel from the anodes 20 of the solid oxide fuel cells 16 in the cathode 38 of the electrochemical device 14, from the anode 36 of the electrochemical device 14 to the combustor 30. A duct 106 supplies hot exhaust gases from the combustor 30 to the secondary inlet 102 of an ejector 100 and the ejector 100 supplies the hot exhaust gases from the combustor 30 and the oxygen from the anode 36 of the electrochemical cell 14 via a duct 108 and a duct 72E to the first passage 92 through the heat exchanger 90. A portion of the unused oxidant from the cathodes 22 of the solid oxide fuel cells 16 is supplied from the cathodes 22 of the solid oxide fuel cells 16 via the duct 70 and the duct 72E to the first passage 92 in the heat exchanger 90. A portion of the unused oxidant from the cathodes 22 of the solid oxide fuel cells 16 is again supplied to the secondary inlet 78 of the oxidant ejector 76. A first portion of the hot gases leaving the first passage 92 through the heat exchanger 90 are supplied via a duct 112 and a duct 114 to the turbine 44 of the gas turbine engine 40 to drive the compressor 42 and the electrical generator 46. The hot gases then leave turbine 44 via an exhaust duct 88 to atmosphere. A second portion of the hot gases leaving the first passage 92 through the heat exchanger 90 are supplied via a duct 112 and a duct 116 to the combustor 30. A duct 118 supplies a portion of the oxidant supplied in duct 82 by the compressor 42 to the primary inlet 104 of the ejector 100.

The invention claimed is:

1. A solid oxide fuel cell system comprising:
a solid oxide fuel cell stack, the solid oxide fuel cell stack comprising at least one solid oxide fuel cell, each solid oxide fuel cell comprising an electrolyte, an anode and a cathode, an oxidant supply being arranged to supply oxidant to the cathode of the at least one solid oxide fuel cell, a fuel supply being arranged to supply fuel to the anode of the at least one solid oxide fuel cell,
an electrochemical device, the electrochemical device comprising an electrolyte, an anode and a cathode,
a duct to supply a portion of unused fuel from the anode of the at least one solid oxide fuel cell to the cathode of the electrochemical device,
a duct to supply a portion of the unused fuel from the anode of the at least one solid oxide fuel cell to the anode of the electrochemical device,
wherein the electrochemical device is arranged to remove oxygen from the unused fuel at the cathode of the electrochemical device substantially throughout an operating cycle of the solid oxide fuel cell system by generating, when the electrochemical device is supplied with electricity, oxygen ions from the oxygen from the unused fuel at the cathode and transporting the generated oxygen ions across the electrolyte to the anode such that the transported oxygen ions are available to the unused fuel at the anode,
a duct to supply the portion of oxygen depleted unused fuel from the cathode of the electrochemical device to the anode of the at least one solid oxide fuel cell, and
a duct to supply the portion of the unused fuel and oxygen at the anode of the electrochemical device to a combustor.

2. The solid oxide fuel cell system of claim 1, further comprising a duct to supply a portion of the unused fuel from the anode of the at least one solid oxide fuel cell directly to the combustor.

3. The solid oxide fuel cell system of claim 1, further comprising a gas turbine engine, the gas turbine engine comprising a compressor and a turbine arranged to drive the compressor, the compressor being arranged to supply at least a portion of the oxidant to the cathode of the at least one solid oxide fuel cell.

4. The solid oxide fuel cell system of claim 1, further comprising a duct to supply a portion of unused oxidant from the cathode of the at least one solid oxide fuel cell back to the cathode of the at least one solid oxide fuel cell.

5. The solid oxide fuel cell system of claim 4, further comprising a duct to supply a portion of the unused oxidant from the cathode of the at least one solid oxide fuel cell to the combustor.

6. The solid oxide fuel cell system of claim 4, further comprising a duct to supply exhaust gases from the combustor to the turbine of the gas turbine engine.

7. The solid oxide fuel cell system of claim 6, wherein the duct to supply the exhaust gases from the combustor to the turbine of the gas turbine engine comprises a heat exchanger.

8. The solid oxide fuel cell system of claim 4, wherein the duct to supply a portion of the unused oxidant from the cathode of the at least one solid oxide fuel cell back to the cathode of the at least one solid oxide fuel cell comprises a heat exchanger.

9. The solid oxide fuel cell system of claim 1, wherein the solid oxide fuel cell stack is arranged to supply electricity to the electrochemical device.

10. The solid oxide fuel cell system of claim 1, wherein the turbine of the gas turbine engine is arranged to drive an electrical generator.

11. The solid oxide fuel cell system of claim 10, wherein the electrical generator is arranged to supply electricity to the electrochemical device.

12. A solid oxide fuel cell system comprising:
a solid oxide fuel cell stack, the solid oxide fuel cell stack comprising at least one solid oxide fuel cell, each solid oxide fuel cell comprising an electrolyte, an anode and a cathode, an oxidant supply being arranged to supply oxidant to the cathode of the at least one solid oxide fuel cell, a fuel supply being arranged to supply fuel to the anode of the at least one solid oxide fuel cell, an electrochemical device, the electrochemical device comprising an electrolyte, an anode and a cathode, a duct to supply a portion of unused fuel from the anode of the at least one solid oxide fuel cell to the cathode of the electrochemical device, a duct to supply a portion of the unused fuel from the anode of the at least one solid oxide fuel cell to the anode of the electrochemical device, wherein the electrochemical device, when supplied with electricity, is arranged to remove oxygen from the unused fuel at the cathode of the electrochemical device substantially throughout an operating cycle of the solid oxide fuel cell system by transferring the oxygen through the electrolyte from the unused fuel at the cathode of the electrochemical device to the unused fuel at the anode of the electrochemical device, a duct supply the portion of oxygen depleted unused fuel from the cathode of the electrochemical device to the anode of the at least one solid oxide fuel cell, and a duct to supply the portion of the unused fuel and oxygen at the anode of the electrochemical device to a combustor.

\* \* \* \* \*